US008868457B2

(12) United States Patent
Irwin (10) Patent No.: US 8,868,457 B2
(45) Date of Patent: Oct. 21, 2014

(54) FIRM OFFERS OF CREDIT SYSTEM

(75) Inventor: Richard F. Irwin, Phoenix, AZ (US)

(73) Assignee: Richard F. Irwin, Ltd., Phoenix, AZ (US)

(*) Notice: Subject to any disclaimer, the term of this patent is extended or adjusted under 35 U.S.C. 154(b) by 620 days.

(21) Appl. No.: 12/354,535

(22) Filed: Jan. 15, 2009

(65) Prior Publication Data

US 2009/0182661 A1 Jul. 16, 2009

Related U.S. Application Data

(60) Provisional application No. 61/006,495, filed on Jan. 16, 2008.

(51) Int. Cl.
*G06Q 40/00* (2012.01)
*G06Q 40/02* (2012.01)

(52) U.S. Cl.
CPC .............. *G06Q 40/02* (2013.01); *G06Q 40/025* (2013.01); *G06Q 40/00* (2013.01)
USPC .......................................................... 705/35

(58) Field of Classification Search
CPC ........ G06Q 40/00; G06Q 20/29; G06Q 20/22
USPC ...................... 705/1–50; 62/6–505
See application file for complete search history.

(56) References Cited

U.S. PATENT DOCUMENTS

| | | | |
|---|---|---|---|
| 5,297,026 A * | 3/1994 | Hoffman | 705/14.18 |
| 5,611,052 A | 3/1997 | Dykstra et al. | |
| 5,797,133 A | 8/1998 | Jones et al. | |
| 5,930,776 A | 7/1999 | Dykstra et al. | |
| 6,385,594 B1 | 5/2002 | Lebda et al. | |
| 6,611,816 B2 | 8/2003 | Lebda et al. | |
| 6,901,384 B2 | 5/2005 | Lynch et al. | |
| 6,968,348 B1 * | 11/2005 | Carone et al. | 707/696 |
| 7,627,527 B1 * | 12/2009 | Hildebrand | 705/39 |
| 2002/0077964 A1 | 6/2002 | Brody et al. | |
| 2002/0077970 A1 | 6/2002 | Lebda et al. | |
| 2002/0138414 A1 | 9/2002 | Baker, IV | |
| 2003/0036995 A1 | 2/2003 | Lazerson | |
| 2003/0036996 A1 | 2/2003 | Lazerson | |
| 2003/0078877 A1 | 4/2003 | Beirne et al. | |
| 2004/0030639 A1 | 2/2004 | Lebda et al. | |
| 2004/0199458 A1 | 10/2004 | Ho | |

(Continued)

OTHER PUBLICATIONS

Appleseed staff, Developing an Equitable Model for the Use of Credit Histories in Financially Underserved Communities, Feb. 2009, web, 1-43.*

*Primary Examiner* — Marissa Liu
(74) *Attorney, Agent, or Firm* — Venable LLP; Michael A. Sartori; Todd R. Farnsworth (57) ABSTRACT

A computer-implemented method for providing firm offers of credit to a consumer includes receiving consumer information from a consumer via a network, receiving a selection via the network from the consumer to permit at least one soft credit inquiry of the consumer's credit record, submitting a soft credit inquiry to a credit reporting agency, the soft credit inquiry based on the consumer information, receiving at least one firm offer of credit from the credit reporting agency, the firm offer of credit resulting from the credit reporting agency performing the soft credit inquiry on the consumer's credit record, each firm offer of credit provided by a credit issuer; and providing the at least one firm offer of credit to the consumer via the network.

10 Claims, 5 Drawing Sheets

(56) References Cited

U.S. PATENT DOCUMENTS

| | | |
|---|---|---|
| 2004/0205019 A1 | 10/2004 | Painter et al. |
| 2005/0065872 A1 | 3/2005 | Moebs et al. |
| 2005/0102221 A1 | 5/2005 | Sulkowski et al. |
| 2005/0165673 A1 | 7/2005 | Brock |
| 2005/0234913 A1* | 10/2005 | Carone et al. .............. 707/9 |
| 2006/0004651 A1 | 1/2006 | Corr et al. |
| 2006/0100944 A1 | 5/2006 | Reddin et al. |
| 2006/0242084 A1* | 10/2006 | Moses ............... 705/64 |
| 2007/0022027 A1* | 1/2007 | Gupta et al. ............ 705/35 |
| 2007/0179827 A1* | 8/2007 | Gupta et al. ............ 705/8 |
| 2007/0260537 A1* | 11/2007 | Stone ............... 705/39 |
| 2008/0126244 A1* | 5/2008 | Loving et al. ............ 705/38 |

\* cited by examiner

FIRM OFFERS OF CREDIT SYSTEM

FIELD

The present invention relates generally to a firm offers of credit system.

BACKGROUND

There are various methods by which consumers may obtain credit. Many of these methods involve the consumer having to apply to a specific credit issuer for a specific type of credit, such as a car loan. The credit issuer performs a check on the consumer's credit history by submitting a hard credit inquiry to a credit reporting agency and decides at least partially on the basis of the results of this credit check whether or not to offer the consumer the requested type of credit. This process has several deficiencies. A consumer who applies for credit is not guaranteed to receive that credit, causing the consumer to possibly have to apply to multiple credit issuers. Each time a credit issuer submits a hard credit inquiry about a consumer's credit history the hard credit inquiry is noted on the consumer's credit history, and the consumer's credit history is negatively impacted. As a result, particularly if the consumer has no credit history, the consumer may be denied credit. Applying for but not receiving credit can make it harder for a consumer to obtain credit in the future. Each time a consumer is rejected for credit, the consumer's creditworthiness is considered to be decreased.

Some consumers may receive via mail credit offers for which they have been preapproved. These offers come directly from a credit issuer and arrive one at a time. The consumer is not given a choice among various offers of credit from different credit issuers for which the consumer is preapproved, unless the offers arrive in the mail at the same time. The consumer cannot proactively obtain these offers at any time, but may call a specific credit issuer and ask to be put on a list to be screened for a preapproved credit offer from that issuer on the next occasion the credit issuer sends out preapproved credit offers.

SUMMARY

One embodiment includes a computer-implemented method for providing firm offers of credit to a consumer including: receiving consumer information from a consumer via a network, receiving a selection via the network from the consumer to permit at least one soft credit inquiry of the consumer's credit record, submitting a soft credit inquiry to a credit reporting agency, the soft credit inquiry based on the consumer information, receiving at least one firm offer of credit from the credit reporting agency, the firm offer of credit resulting from the credit reporting agency performing the soft credit inquiry on the consumer's credit record, each firm offer of credit provided by a credit issuer; and providing the at least one firm offer of credit to the consumer via the network.

One embodiment includes a computer-implemented method for providing firm offers of credit to a consumer including: receiving via a network from a credit arranger consumer information of a consumer and a consumer selection to permit a soft credit inquiry, performing a soft credit inquiry on credit history of a the consumer based on the consumer information, comparing the results of the soft credit inquiry on the credit record of the consumer against at least one cascade from at least one credit issuer to obtain a comparison result, compiling a list of a plurality of a firm offers of credit for which the consumer is preapproved based on the comparison result; and transmitting via the network to the credit arranger at least one firm offer of credit for which the consumer is preapproved.

One embodiment includes a system for providing firm offers of credit to a consumer including: a credit arranger computer system adapted to receive consumer information from a consumer via a network, receive a selection to permit a soft credit inquiry from the consumer via the network, transmit the consumer information to a credit reporting agency, receive at least one firm offer of credit from the credit reporting agency, and transmit the at least one firm offer of credit to the consumer via the network.

One embodiment includes A computer-readable medium comprising instructions, which when executed by a computer system causes the computer system to perform operations for providing firm offers of credit to a consumer, including instructions for receiving consumer information from a consumer via a network, instructions for receiving a selection via the network from the consumer to permit at least one soft credit inquiry of the consumer's credit record, instructions for submitting a soft credit inquiry to a credit reporting agency, the soft credit inquiry based on the consumer information, instructions for receiving at least one firm offer of credit from the credit reporting agency, the firm offer of credit resulting from the credit reporting agency performing the soft credit inquiry on the consumer's credit record, each firm offer of credit provided by a credit issuer; and instructions for providing the at least one firm offer of credit to the consumer via the network.

Further features of the invention, as well as the structure and operation of various embodiments of the invention, are described in detail below with reference to the accompanying drawings.

BRIEF DESCRIPTION OF THE DRAWINGS

The foregoing and other features of the invention will be apparent from the following, more particular description of exemplary embodiments of the invention, as illustrated in the accompanying drawings wherein like reference numbers generally indicate identical, functionally similar, and/or structurally similar elements. The left most digits in the corresponding reference number indicate the drawing in which an element first appears.

DEFINITIONS

In describing the invention, the following definitions are applicable throughout (including above).

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a microcomputer; a server; a client; an interactive television; a web appliance; a telecommunications device with internet access; a hybrid combination of a computer and an interactive television; a portable computer; a personal digital assistant (PDA); a portable telephone; application-specific hardware to emulate a computer and/or software, such as, for example, a digital signal processor (DSP), a field-programmable gate array (FPGA), a chip, chips, or a chip set; an optical computer; and an apparatus that may accept data, may process data in accordance with one or more stored software programs, may generate results, and typically may include input, output, storage, arithmetic, logic, and control units.

"Software" may refer to prescribed rules to operate a computer. Examples of software may include: software; code segments; instructions; applets; pre-compiled code; compiled code; computer programs; and programmed logic.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a memory chip; and/or other types of media that can store machine-readable instructions thereon.

A "computer system" may refer to a system having one or more computers, where each computer may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet. Exemplary networks may operate with any of a number of protocols, such as Internet protocol (IP), asynchronous transfer mode (ATM), and/or synchronous optical network (SONET), user datagram protocol (UDP), IEEE 802.x, etc.

A "firm offer of credit" is defined as an offer of credit whose terms cannot be changed by the credit issuer once the offer of credit has been presented to the consumer.

A "soft credit inquiry" (or "soft inquiry") is defined as an indication of an inquiry into a consumer's credit history that does not negatively impact the consumer's credit history.

A "hard credit inquiry" (or "hard inquiry") is defined as an inquiry into a consumer's credit record which may be noted on the consumer's credit record and may negatively impact the consumer's record.

DETAILED DESCRIPTION OF EMBODIMENTS OF THE PRESENT INVENTION

Exemplary embodiments of the invention are discussed in detail below. While specific exemplary embodiments are discussed, it should be understood that this is done for illustration purposes only. In describing and illustrating the exemplary embodiments, specific terminology is employed for the sake of clarity. However, the invention is not intended to be limited to the specific terminology so selected. A person skilled in the relevant art will recognize that other components and configurations may be used without parting from the spirit and scope of the invention. It is to be understood that each specific element includes all technical equivalents that operate in a similar manner to accomplish a similar purpose. Each reference cited herein is incorporated by reference. The examples and embodiments described herein are non-limiting examples.

Figure 1:
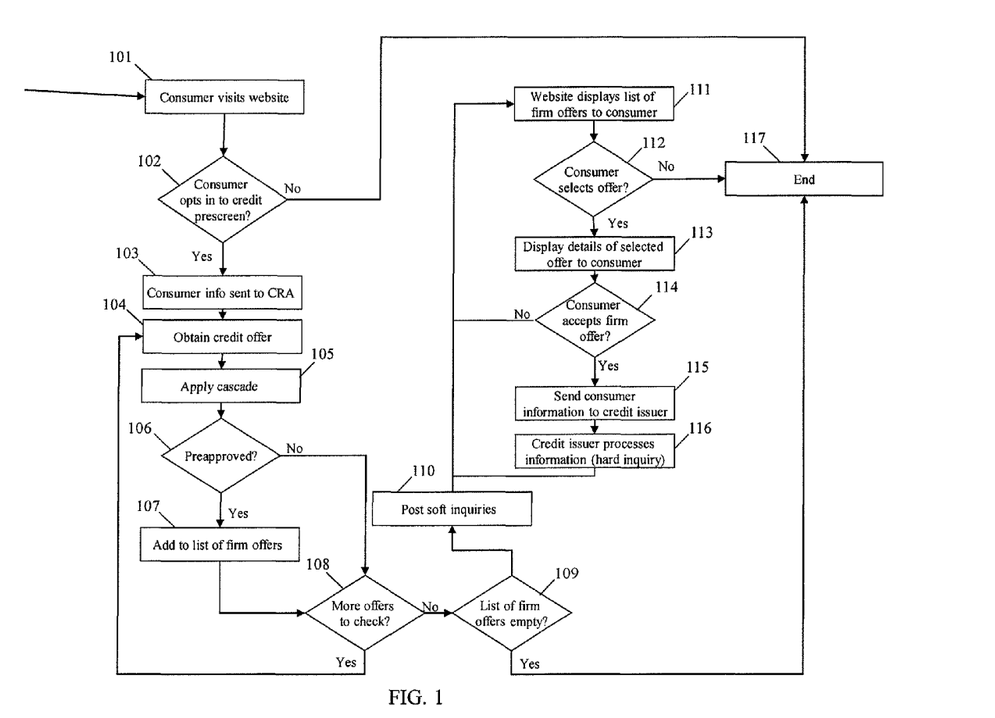
FIG. 1 depicts an exemplary flowchart for providing firm offers of credit to a consumer
Figure 2:
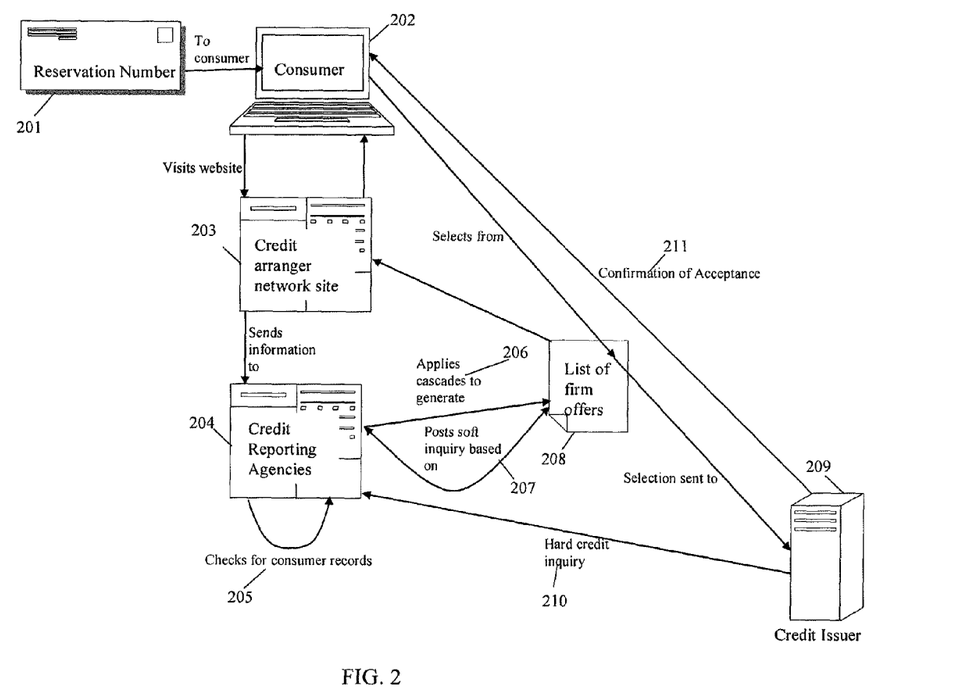
FIG. 2 depicts an exemplary embodiment of a system for providing firm offers of credit to a consumer.

FIG. 1 depicts an exemplary embodiment of a flowchart for providing firm offers of credit to a consumer, and FIG. 2 depicts an exemplary system for a firm offers of credit system for providing firm offers of credit to a consumer. An exemplary embodiment of the invention is discussed with respect to FIGS. 1 and 2.

In block 101, the consumer may use a computer, a computer system, or other suitable computing device, connected to a network to visit a site on the network such as, for example, a web page for a credit arranger network site 203 on the Internet. The credit arranger network site 203 may be any suitable computer or computer system for hosting a site on the network. The consumer may locate the site via a mail piece 201 sent to the consumer, or via other known techniques to locate a site without first receiving a mail piece 201. The mail piece 201 may be an envelope, postcard, e-mail, text message, or any other suitable item used to send information to an individual. The network site address for the credit arranger network site 203 may be communicated to the consumer by other known techniques, including, for example, television, radio, and print advertisements, and internet search engines.

Figure 3:
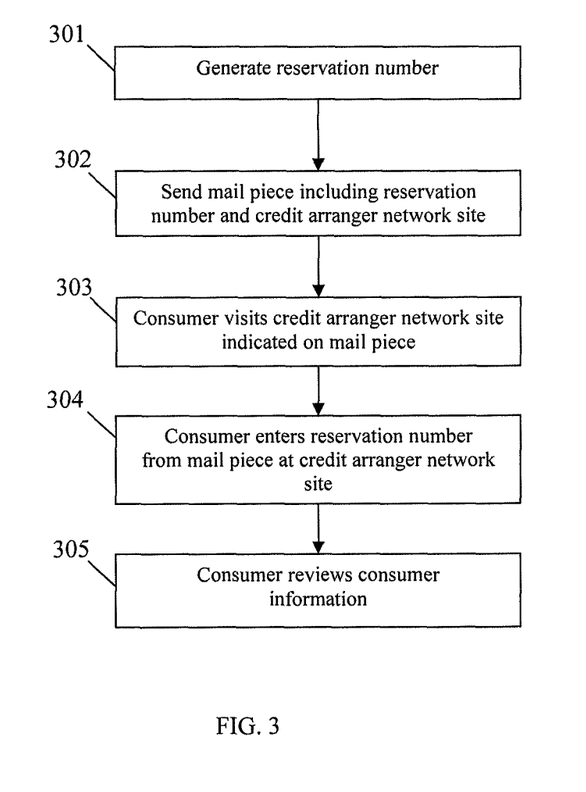
FIG. 3 depicts an exemplary embodiment of a flowchart for directing a consumer to a network site for a firm offers of credit system.

The process of creating a mail piece and directing a consumer to the network site based on the mail piece is discussed further using FIG. 3.

Referring to FIG. 3, in block 301, a reservation number may be generated for a mail piece 201. The mail piece 201 may include the reservation number, which may be, for example, a character string that may be unique and may be used to identify the individual consumer 202 to whom the mail piece 201 has been sent. The reservation number may be generated by, for example, a computer connected to a database containing information on consumers. The reservation number may be any string of letters, characters, numbers, bar code symbols, or other symbols suitable for encoding information identifying the individual consumer the reservation for whom the reservation number was generated. The reservation number may be unique to the consumer to whom the mail piece 201 containing the reservation number will be sent.

In block 302, the mail piece 201 containing the reservation number and a network address may be sent to the consumer. The mail piece 201 may be any form of communication that may be used to contact a consumer, including, for example a postcard, an e-mail or a simple short message service (SMS) message. The mail piece 201 may contain a network address for the credit arranger network site 203, such as, for example, the address of site on the World Wide Web belonging the credit arranger network site 203.

In block 303, the consumer may use the computer, computer system, or other suitable computing device to visit the network site for the credit arranger network site 203 at the network address indicated on the mail piece 201.

In block 304, the credit arranger network site 203 may display to the consumer, via the network, a form into which the consumer may input the reservation number received on the mail piece 201.

In block 305, based on the reservation number the consumer has entered, the credit arranger network site 203 may identify the unique consumer and display to the consumer via the network information pertaining to the consumer such that the consumer may review the information. Such information may include, for example, the consumer's name, the consumer's home address, the consumer's telephone numbers, and any other information specific to the consumer. The consumer may have the opportunity to review the information displayed to the consumer by the credit arranger network site 203 such that the consumer may correct any mistaken information and fill in any incomplete information by transmitting the necessary information to the credit arranger network site 203 via the network. If the network site 203 has no information on the consumer, the consumer may be required to provide the requested information to the network site 203 via the network.

Referring back to FIG. 1, in block 102, the credit arranger network site 203 may present to the consumer the option to opt in to a credit prescreen. A credit prescreen may include performing a soft inquiry on the consumer's record and comparing the results of the soft inquiry to a set of criteria which may determine a pre-approval status for the consumer. This option may be presented by the credit arranger network site 203 in any suitable manner, for example, through the use of checkboxes, radio buttons, etc. For example, the consumer may be asked directly whether or not they wish to opt in to the credit prescreen. As another example the consumer may be asked to opt in to a service, where one component of the service is the credit prescreen. The consumer may submit the choice via the network to the credit arranger network site 203. If the consumer chooses to opt-in to the credit prescreen or service, flow proceeds to block 103; otherwise flow proceeds to block 117 and ends.

In block 103, the consumer's information may be sent via the network from the credit arranger network site 203 to at least one of a number of computer(s), computer system(s), or the like of credit reporting agencies (CRAs) 204. The credit reporting agency 204 may be an organization such as, for example, Experian™, Equifax®, or TransUnion® that keeps a database of consumers and their credit histories. The at least one credit reporting agency 204 may obtain the consumer's credit history 205.

In block 104, once the at least one credit reporting agency 204 has obtained the consumer's credit history 205, the at least one credit reporting agency 204 may obtain at least one credit offer from computer(s), computer system(s), or the like of at least one credit issuer 209. A credit issuer 209 may be, for example, a bank, a savings and loan, a mortgage company, a credit card company or any other organization that offers credit to consumers. A credit offer may refer to an offer of an extension of a line of credit from any credit issuer, such as, for example, a bank. The credit reporting agency 204 may obtain the at least one offer of credit by loading a list of previously compiled offers of credit from a database, for example.

In block 105, the credit reporting agency 204 may apply a cascade 206 relating to a credit offer from the database of credit offers, to the consumer's credit history 205. A cascade for a particular credit offer may be a credit prescreen model used to determine if a particular consumer's credit history qualifies the consumer to receive preapproval for that particular credit offer.

In block 106, if the consumer's credit history qualifies the consumer to be preapproved for a credit offer, flow proceeds to block 107. Otherwise, if the consumer is not qualified to be preapproved for a credit offer, flow proceeds to block 108.

In block 107, the credit offer for which the consumer is preapproved may be added to, for example, a list of firm offers of credit 208. A credit offer which is a firm offer of credit may be an offer whose terms cannot be changed by the credit issuer once the offer of credit has been presented to the consumer. The list of firm offers of credit 208 for which the consumer has been preapproved may contain at least one universal offer of credit. A universal offer of credit may refer to an offer of credit for which all consumers are preapproved without respect to the nature of their credit history.

In block 108, the at least one credit reporting agency 204 may check the offers of credit for additional offers of credit for which it has not yet applied a cascade. If the at least one credit reporting agency 204 finds at least one additional offer of credit among the obtained offers of credit for which it may apply a cascade to determine if the consumer is preapproved, flow proceeds back to block 106. If all offers have been checked, flow proceeds to block 109.

In block 109, if there are no offers of credit for which the consumer is preapproved, for example, if the list of firm offers of credit is empty, flow proceeds to block 117 and ends. If there is at least one firm offer of credit for which the consumer is preapproved, flow proceeds to block 110.

In block 110, the at least one credit reporting agency may post a soft inquiry 207 to the consumer's credit record. The soft inquiry 207 may be an indication of an inquiry into the consumer's credit history 205 that does not negatively impact the consumer's credit history 205. The soft inquiry may list the organizations whose firm offers of credit the consumer has been preapproved for.

In block 111, when the at least one credit reporting agency 204 has finished checking the obtained offers of credit to determine if the consumer may be preapproved to receive at least one of the obtained offers of credit, the credit reporting agency 204 may send, via the network, to the credit arranger network site 203 the list of firm offers of credit for which the consumer is preapproved. The list 208 may be displayed to the consumer via the network site 203.

In block 112, the consumer may select to obtain more details about a specific firm offer of credit or a plurality of firm offers of credit from the list of firm offers of credit 208. If the consumer selects a firm offer or offers of credit to obtain more details, flow proceeds to block 113. Otherwise, flow proceeds to block 117 and ends.

In block 113, the consumer's selection in block 112 may result in details about the elected firm offer or offers of credit being displayed to the consumer. Details displayed regarding a firm offer of credit may include, for example, information such as the name of the credit issuer and the terms of the offer of credit, such as, for example, interest rate and repayment period. This information may be displayed on the same web page, a new web page, or a new window on the computer 202.

As an option blocks 112 and 113 may be replaced by providing the details of the firm offers with the firm offers 208 in block 111.

In block 114, the consumer may select to accept a firm offer of credit. The consumer may select to accept the firm offer of credit by transmitting a selection via the network to the credit arranger network site 203. If the consumer selects to accept the firm offer of credit, flow proceeds to block 115. If the consumer selects to not accept the firm offer of credit, flow proceeds to back to block 111, wherein the list of firm offers of credit 208 is displayed to the consumer, such that the consumer may view additional details on and select to accept other firm offers of credit.

In block 115, the consumer has selected to accept one of the firm offers of credit. The credit arranger network site 203 may then send, via the network, the consumer's information to the credit issuer 209 responsible for the firm offer of credit the consumer has chosen to accept. The credit issuer 209 may also receive the consumer's credit history from the credit arranger network site 203, or by performing a hard inquiry on the consumer using the consumer's information.

In block 116, the credit issuer 209 may then process the consumer's information and credit history. To process the consumer's information and credit history, the credit issuer 209 may submit to at least one credit reporting agency 204 a hard credit inquiry 210 on the consumer's credit history. A hard credit inquiry may be an inquiry into a consumer's credit record which may be noted on the consumer's credit record and may negatively impact the consumer's record. The credit issuer 209 may request additional information from the consumer of the type that is not found in the consumer's credit history, for example, the consumer's household income. Final approval for the firm offer of credit may be predicated on the additional information meeting criteria set by the credit issuer 209. The credit issuer 209 may notify the consumer that the consumer's acceptance of the firm offer of credit has been confirmed via a message of confirmation 211 sent over the network and displayed to the consumer. Flow proceeds back to block 111, wherein the list of firm offers of credit 208 is displayed to the consumer, such that the consumer may view and select to accept additional firm offers of credit.

Figure 4:
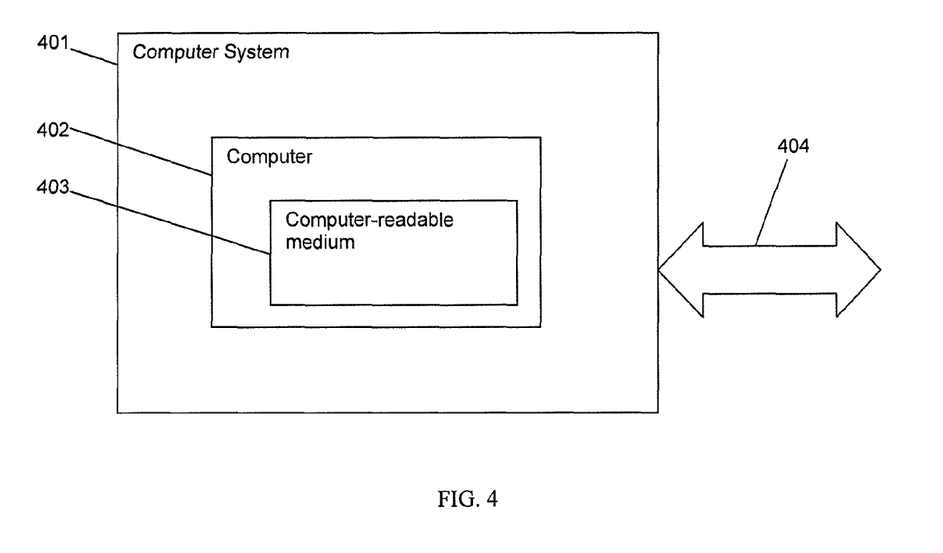
FIG. 4 depicts an exemplary embodiment of a computer system for use with embodiments of the present invention.

FIG. 4 depicts a computer system for use with embodiments of the present invention. The computer system 401 includes a computer 402 for implementing the invention. The computer 402 includes a computer-readable medium 403 embodying software for implementing the invention and/or software to operate the computer 402 in accordance with the invention. As an option, the computer system 401 includes a connection to a network 404. With this option, the computer 402 is able to send and receive information (e.g., software, data, documents) from other computer systems via the network 404.

Figure 5:
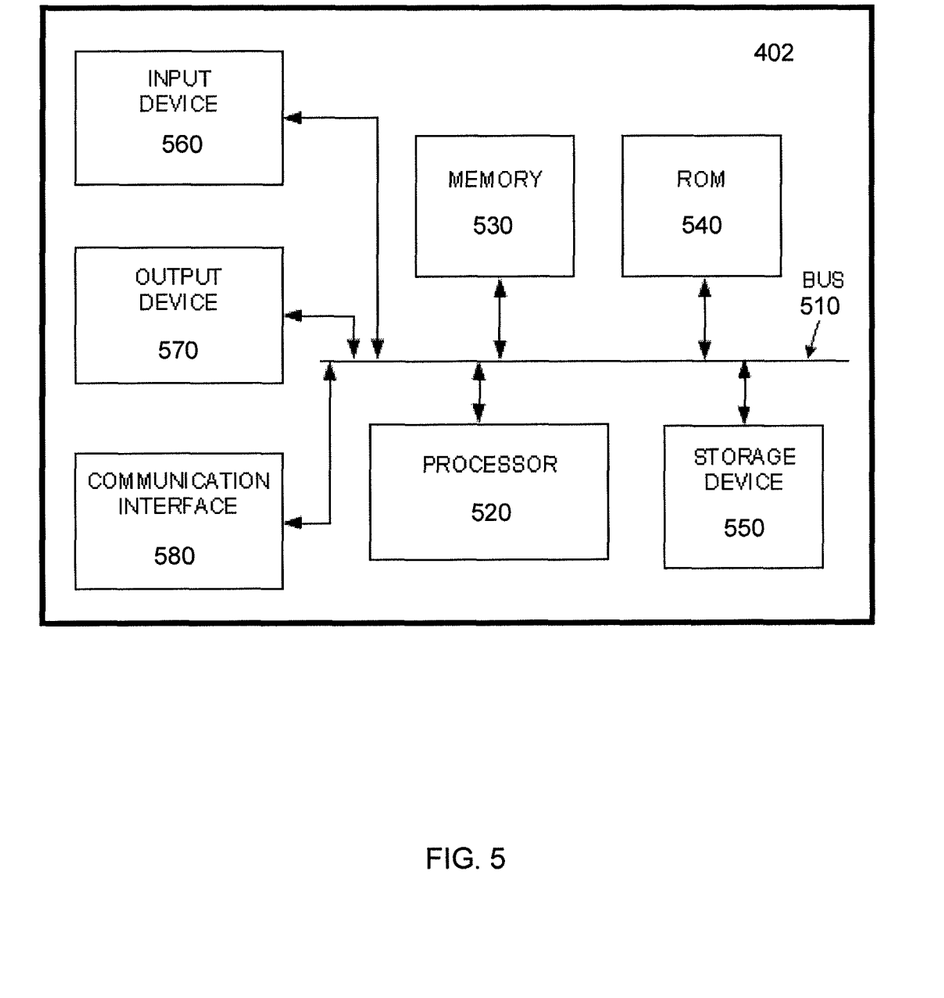
FIG. 5 depicts an exemplary architecture for implementing computer 402 of FIG. 4.

FIG. 5 depicts an exemplary architecture for implementing computer 402 of FIG. 4. As illustrated in FIG. 5, computer 402 may include a bus 510, a processor 520, a memory 530, a read only memory (ROM) 540, a storage device 550, an input device 560, an output device 570, and a communication interface 580.

Bus 510 may include one or more interconnects that permit communication among the components of computer 402. Processor 520 may include any type of processor, microprocessor, or processing logic that may interpret and execute instructions (e.g., a field programmable gate array (FPGA)). Processor 520 may include a single device (e.g., a single core) and/or a group of devices (e.g., multi-core). Memory 530 may include a random access memory (RAM) or another type of dynamic storage device that may store information and instructions for execution by processor 520. Memory 530 may also be used to store temporary variables or other intermediate information during execution of instructions by processor 620.

ROM 540 may include a ROM device and/or another type of static storage device that may store static information and instructions for processor 520. Storage device 450 may include a magnetic disk and/or optical disk and its corresponding drive for storing information and/or instructions. Storage device 550 may include a single storage device or multiple storage devices, such as multiple storage devices operating in parallel. Moreover, storage device 550 may reside locally on computer 402 and/or may be remote with respect to computer 402 and connected thereto via network 404 and/or another type of connection, such as a dedicated link or channel.

Input device 560 may include any mechanism or combination of mechanisms that permit an operator to input information to computer 402, such as a keyboard, a mouse, a touch sensitive display device, a microphone, a pen-based pointing device, and/or a biometric input device, such as a voice recognition device and/or a finger print scanning device. Output device 570 may include any mechanism or combination of mechanisms that outputs information to the operator, including a display, a printer, a speaker, etc.

Communication interface 580 may include any transceiver-like mechanism that enables computer 402 to communicate with other devices and/or systems. For example, communication interface 580 may include one or more interfaces, such as a first interface coupled to network 404. Alternatively, communication interface 580 may include other mechanisms (e.g., a wireless interface) for communicating via a network, such as a wireless network. In one implementation, communication interface 580 may include logic to send code to a destination device, such as a target device that can include general purpose hardware (e.g., a personal computer form factor), dedicated hardware (e.g., a digital signal processing (DSP) device adapted to execute a compiled version of a model or a part of a model), etc.

Computer 402 may perform certain functions in response to processor 520 executing software instructions contained in a computer-readable medium, such as memory 530. In alternative embodiments, hardwired circuitry may be used in place of or in combination with software instructions to implement features consistent with principles of the invention. Thus, implementations consistent with principles of the invention are not limited to any specific combination of hardware circuitry and software.

The examples and embodiments described herein are non-limiting examples.

While various exemplary embodiments have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A computer-implemented method for providing firm offers of credit to a consumer comprising:

receiving, by one or more processors, consumer information from a consumer via a network;

receiving, by the one or more processors, via the network from the consumer, a selection to opt in to a credit prescreen or a selection to opt in to a service including the credit prescreen;

submitting, by the one or more processors, to a credit reporting agency via the network, at least a portion of the consumer information;

receiving, by the one or more processors, from the credit reporting agency via the network, a list including at least one firm offer of credit provided by at least one credit issuer and resulting from the credit reporting agency performing the credit prescreen, the credit prescreen including:

obtaining, by the one or more processors, a credit history of the consumer;

comparing, by the one or more processors, the credit history of the consumer to at least one credit prescreen model to determine if the credit history of the consumer qualifies the consumer to receive a firm offer of credit corresponding to a particular credit prescreen model; and if the consumer qualifies to receive the firm offer of credit corresponding to the credit prescreen model:
   adding, to the list, the firm offer of credit corresponding to the credit prescreen model; and
   posting, to a credit record of the consumer, a soft credit inquiry related to the added firm offer of credit; and providing, by the one or more processors, to the consumer via the network, the list including the at least one firm offer of credit.

2. The computer-implemented method of claim 1, further comprising:
   receiving, from the consumer via the network, a selection of one of the at least one firm offer of credit for which the consumer is preapproved; and
   transmitting, to the consumer via the network, terms of the selected firm offer of credit.

3. The computer-implemented method of claim 1, further comprising:
   receiving a selection from the consumer via the network to accept one of the at least one firm offer of credit to obtain an accepted firm offer of credit.

4. The computer-implemented method of claim 3, further comprising:
   transmitting, to the credit issuer providing the accepted firm offer of credit via the network, the consumer information and the accepted firm offer of credit.

5. The computer-implemented method of claim 4, wherein the credit issuer providing the accepted firm offer of credit performs a hard credit inquiry on the consumer's credit record.

6. The computer-implemented method of claim 1, wherein receiving consumer information from the consumer comprises:
   providing the consumer with a network address and an identifying character string;
   providing to the consumer, via the network, the consumer information based on the network address and identifying character string; and
   receiving updated consumer information from the consumer via the network.

7. The computer-implemented method of claim 6, wherein the consumer is provided with the network address and the identifying character string by a mail piece.

8. The computer-implemented method of claim 1, wherein if the consumer does not qualify to receive the firm offer of credit corresponding to the credit prescreen model:
   the firm offer of credit corresponding to the credit prescreen model is not added to the list; and
   a soft credit inquiry related to the firm offer of credit corresponding to the credit prescreen model is not posted to a credit record of the consumer.

9. The computer-implemented method of claim 1, further comprising:
   receiving, via the network from the consumer, a selection of at least one firm offer of credit to receive additional information; and
   providing, to the consumer via the network, the additional information regarding the selected at least one firm offer of credit.

10. The computer-implemented method of claim 9, wherein the additional information regarding the selected at least one firm offer of credit includes at least one of:
   a name of a credit issuer of the selected firm offer of credit;
   an interest rate of the selected firm offer of credit; or
   a repayment period of the selected firm offer of credit.

* * * * *